US012571934B2

(12) United States Patent
Zielinski et al.

(10) Patent No.: US 12,571,934 B2
(45) Date of Patent: Mar. 10, 2026

(54) NMR-BASED LITHIUM MEASURING AND MONITORING DOWNHOLE TOOLS, METHODS OF USING SAID DOWNHOLE TOOLS, AND METHODS OF MEASURING LITHIUM CONCENTRATIONS BASED ON NMR MEASUREMENTS ACQUIRED BY SAID DOWNHOLE TOOLS

(71) Applicant: Schlumberger Technology Corporation, Sugar Land, TX (US)

(72) Inventors: Lukasz Zielinski, Cambridge, MA (US); Ronald E. G. Van Hal, Cambridge, MA (US); Shawn David Taylor, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 135 days.

(21) Appl. No.: 18/423,517

(22) Filed: Jan. 26, 2024

(65) Prior Publication Data

US 2025/0244497 A1     Jul. 31, 2025

(51) Int. Cl.
*G01V 3/32*          (2006.01)
*E21B 49/08*         (2006.01)

(52) U.S. Cl.
CPC ................ *G01V 3/32* (2013.01); *E21B 49/08* (2013.01)

(58) Field of Classification Search
CPC .................................. G01V 3/32; E21B 49/08
See application file for complete search history.

(56) References Cited

U.S. PATENT DOCUMENTS 3,667,035 A      5/1972   Slichter
7,402,424 B2     7/2008   Raghuraman et al.
7,799,278 B2     9/2010   Salamitou et al.
(Continued)

OTHER PUBLICATIONS

"Laser Induced Breakdown Spectroscopy (LIBS)", https://www.whoi.edu/science/AOPE/people/amichel/styled-5/index.html, 4 pages.
(Continued)

*Primary Examiner* — Gregory H Curran
(74) *Attorney, Agent, or Firm* — Jeffrey D. Frantz

(57) ABSTRACT

NMR-based lithium measuring and monitoring downhole tools and methods measure at least one lithium concentration of a fluid in a borehole and/or a surrounding formation of the borehole, wherein the downhole tool has an NMR sensor having a magnet-coil geometry with at least one magnet and a RF coil tuned to match a Larmor frequency of a nucleus of lithium. The downhole tools and methods acquire an NMR-based lithium concentration measurement of a fluid at a sensitive region within the wellbore and/or formation that is defined by the magnet-coil geometry of the NMR sensor and determine a lithium concentration of the fluid at the sensitive region based on the acquired NMR-based lithium concentration measurement. The downhole tools and methods may interpret an acquired signal based on relaxation distributions of total acquired signals, wherein the acquired signal is indicative of the acquired NMR-based lithium concentration measurement and separate a lithium signal from confounding signals deriving from other non-lithium nuclei based on the interpreted acquired signal.

22 Claims, 11 Drawing Sheets

(56) References Cited

U.S. PATENT DOCUMENTS

| | | | |
|---|---|---|---|
| 7,901,555 B2 | 3/2011 | Jiang et al. | |
| 8,826,981 B2 | 9/2014 | van Hal et al. | |
| 9,244,034 B2 | 1/2016 | Lawrence et al. | |
| 11,603,759 B2 | 3/2023 | Sullivan et al. | |
| 12,259,516 B2 * | 3/2025 | Chen | G01V 3/32 |
| 2007/0210798 A1 | 9/2007 | Race | |
| 2014/0107928 A1 * | 4/2014 | Roy | G01V 3/18 |
| | | | 702/7 |

OTHER PUBLICATIONS

Raymundo-Pereira, P.A., et al., "Electrochemical Evaluation of the a Carbon-Paste Electrode Modified With Spinel Manganese (IV) Oxide Under Flow Conditions for Amperometric Determination of Lithium", Electrochimica Acta, Feb. 1, 2011, pp. 2552-2558, vol. 56, No. 5.

Kim, T., et al., "Applications of Voltammetry in Lithium Ion Battery Research", Journal of electrochemical science and technology, 2020, pp. 14-25, vol. 11, No. 1.

* cited by examiner

NMR-BASED LITHIUM MEASURING AND MONITORING DOWNHOLE TOOLS, METHODS OF USING SAID DOWNHOLE TOOLS, AND METHODS OF MEASURING LITHIUM CONCENTRATIONS BASED ON NMR MEASUREMENTS ACQUIRED BY SAID DOWNHOLE TOOLS

FIELD OF THE DISCLOSURE

The present disclosure relates to NMR-based lithium measuring and monitoring downhole tools (hereinafter "downhole tool" or "downhole tools"), methods of using the downhole tools, methods of deploying said downhole tools in boreholes, and methods of measuring and monitoring lithium concentrations of brines in reservoirs and/or surrounding subterranean formations. Additionally, the downhole tools disclosed herein measure, determine and/or monitor the lithium concentrations based on nuclear magnetic resonance (hereinafter "NMR") measurements in the wellbores and lithium brine producing wells (collectively referred to hereinafter as "lithium well" or "lithium wells"). The methods disclosed herein may dispose, deploy, and/or position the downhole tools in the lithium wells, measure, determine, and/or monitor the lithium concentrations based on the NMR measurements, and interpretate and analyze measurements, data, and/or electronic signals acquired by the downhole tools to measure, determine, and/or monitor the lithium concentrations in the lithium wells.

BACKGROUND

Currently there are no known tools that measure lithium downhole. Lithium brine is pumped to the surface where fluid samples are collected and sent to a laboratory for analysis. The problem of distinguishing lithium signal(s) from other nuclei is not an issue in a known laboratory setting with homogeneous uniform fields. Distinguishing the lithium signal(s) only becomes a problem for 'inside-out' downhole tool measurements and also in the fringes of the flow-through measurement. Known downhole NMR tools use the so-called "inside-out" geometry where both the static magnetic field from the magnet as well as the radio frequency (hereinafter "rf" or "RF") field from an electromagnetic coil are both projected outside the known downhole NMR tools and into the formation. None of these known downhole NMR tools are capable of measuring lithium downhole and inside wellbores.

In contrast to known downhole NMR tools, the present downhole tools and methods disclosed herein overcome the above-mentioned problems and/or disadvantages by acquiring NMR-based measurements downhole and interpreting and/or analyzing NMR-based measurements, data, and/or signals acquired downhole by the present tools and methods.

SUMMARY OF THE DISCLOSURE

In one or more embodiments, downhole tools measure at least one lithium concentration of a fluid in a borehole disposed within a surrounding formation. The downhole tool may comprise a nuclear magnetic resonance (NMR) sensor having a magnet-coil geometry comprise one or more magnets and at least one tunable radiofrequency (RF) coil tuned to match a first Larmor frequency of a nucleus of lithium, first electronics connected to and in communication with NMR sensor, and second electronics and NMR spectrometer connected to and in communication with the first electronics such that the NMR sensor is connected to and in communication with the second electronics and the NMR spectrometer via the first electronics, wherein the downhole tool is one selected from the group consisting of a NMR-based lithium open-hole logging tool, a permanently mounted downhole NMR-based lithium monitoring tool, and a downhole NMR-based lithium fluid sampling tool.

In some embodiments, the downhole tool is or may be the NMR-based lithium open-hole logging tool and NMR sensor has a centralized inside-out NMR tool geometry or a single-sided inside-out NMR tool geometry.

In some embodiments, the downhole tool is or may be an open-hole production logging tool.

In some embodiments, the NMR sensor has or may have a centralized inside-out NMR tool geometry with the one or more magnets comprising a first magnet and a second magnet and the at least one tunable RF coil disposed between the first magnet and the second magnet or the NMR sensor has the single-sided inside-out NMR tool geometry with the at least one tunable RF coil disposed between the one or more magnets and a wall of the downhole tool.

In some embodiments, the downhole tool is or may be the NMR-based lithium open-hole logging tool and the NMR sensor has or may have a flow-through NMR tool geometry.

In some embodiments, the NMR sensor has or may have a length defined between a top end and an opposite bottom end, the magnet-coil geometry is or may be disposed between the top end and the opposite bottom end, and a tube extends or may extend from the top end through the magnet-coil geometry to the opposite bottom end.

In some embodiments, the downhole tool further comprises at least one flow line or flow path through the NMR sensor and leading to at least one internal chamber of the downhole tool.

In some embodiments, the downhole tool is or may be a permanently mounted downhole NMR-based lithium monitoring tool that is stand alone or mountable on at least one completion or downhole hardware element.

In some embodiments, the downhole tool is or may be a downhole NMR-based lithium fluid sampling tool comprising pistons and/or calipers for pushing the downhole tool against the surrounding formation.

In one or more embodiments, systems measure and/or monitor at least one lithium concentration of a fluid in a subterranean formation or a wellbore disposed within the subterranean formation. The system comprises the downhole tool of claim disposed within the wellbore and at least one sensitive region defined by the magnet-coil geometry of the NMR sensor and fully contained within the subterranean formation or the wellbore, wherein the NMR sensor is or may be configured to acquire at least one NMR-based lithium concentration measurement of the fluid at the at least one sensitive region within the subterranean formation or the wellbore.

In some embodiments, the fluid is or may be a lithium brine and the wellbore is or may be a lithium brine producing well.

In some embodiments, the sensitive region is or may be disposed within the subterranean formation or between the at least one tunable coil and a wall of the wellbore.

In some embodiments, the downhole tool is or may be a NMR-based lithium open-hole logging tool and NMR sensor has or may have a centralized inside-out NMR tool geometry or a single-sided inside-out NMR tool geometry.

In some embodiments, the downhole tool is or may be an open-hole production logging tool.

In some embodiments, the downhole tool is or may be the NMR-based lithium open-hole logging tool and the NMR sensor has or may have a flow-through NMR tool geometry.

In some embodiments, the system further comprises at least one downhole element or hardware element disposed within the wellbore, wherein the downhole tool is attached to or is part of the at least one downhole element or hardware element.

In some embodiments, the system further comprises at least one of: a wireline or slickline deployed within the wellbore and comprising the downhole tool; a drill string deployed within the wellbore and comprising the downhole tool and at least one drilling tool; or a coiled-tubing deployed within the wellbore and comprising the downhole tool.

In one or more embodiments, methods comprise or may comprise deploying the downhole tool into a wellbore disposed within a subterrain formation, acquiring at least one lithium NMR-based measurement of a fluid at a sensitive region within the subterrain formation or the wellbore, wherein the sensitive region is defined by the magnet-coil geometry of the NMR sensor, and determining a lithium concentration of the fluid at the sensitive region based on the acquired at least one lithium NMR-based measurement.

In some embodiments, the method further comprises or may comprise interpretating an acquired signal based on relaxation distributions of total acquired signals, wherein the acquired signal is indicative of the acquired at least one lithium NMR-based measurement.

In some embodiments, the method further comprises or may comprise separating a lithium signal from confounding signals deriving from other non-lithium nuclei based on the interpreted acquired signal.

In some embodiments, the method further comprises or may comprise tuning the at least one tunable RF coil to match a second Larmor frequency of a nucleus of an element of interest, wherein the element of interest is at least one element selected from the group consisting of lithium, chlorine, cobalt, vanadium, uranium, iridium, manganese, boron, potassium, sodium, bromine, magnesium, terbium, europium, lanthanum, praseodymium, scandium, holmium, and lutetium.

In some embodiments, the method further comprises or may comprise acquiring at least one element of interest NMR-based measurement of the fluid at the sensitive region and determining an element of interest concentration of the fluid at the sensitive region based on the acquired at least one element of interest NMR-based measurement.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

NMR-Based Downhole Formation or Wellbore Evaluation Tools

Figure 1:
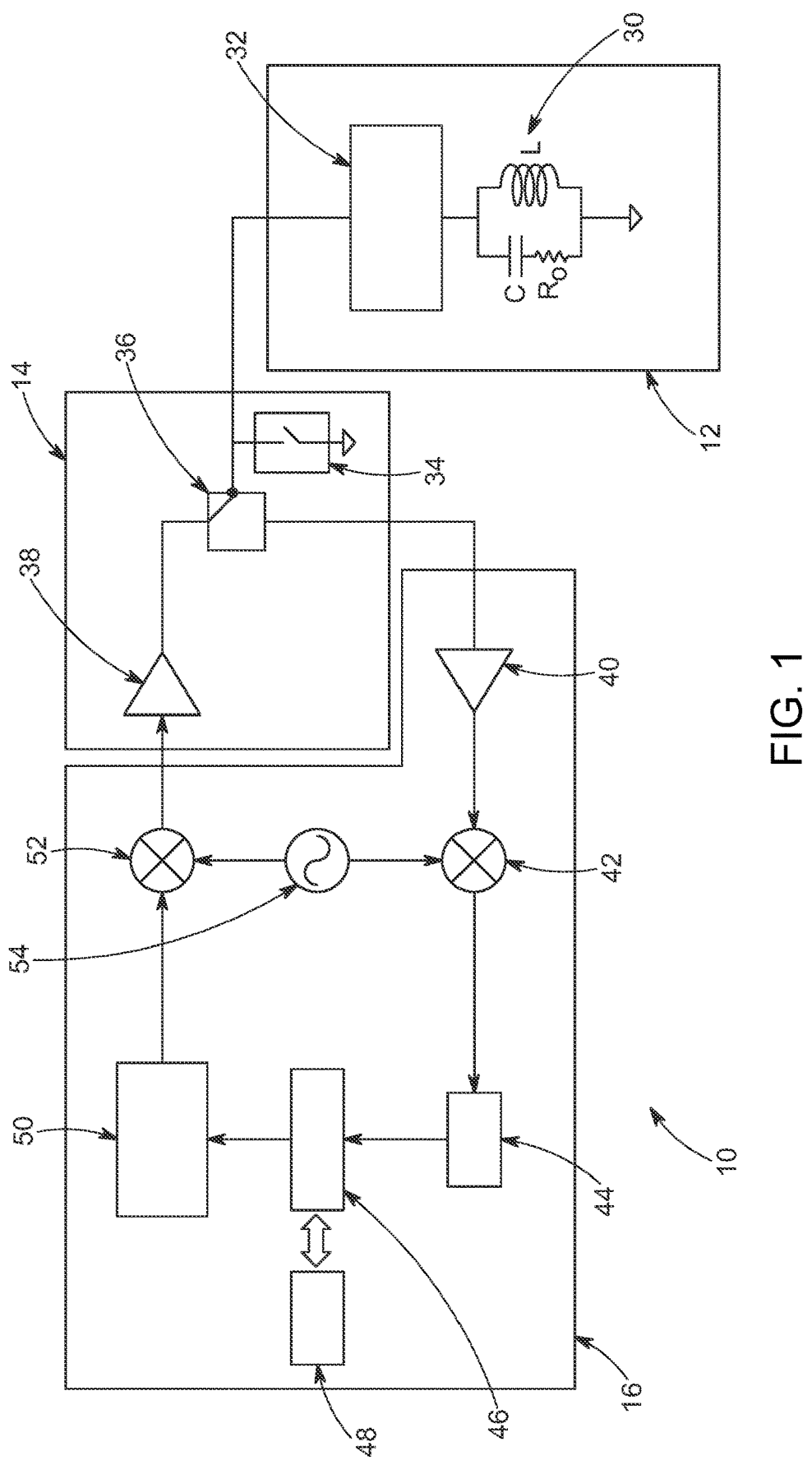
FIG. 1 illustrates schematics of NMR-based downhole tools disclosed herein, according to one or more embodiments of the present disclosure.

FIG. 1 illustrates schematics of NMR-based lithium measuring and monitoring downhole tools 10 (hereinafter "downhole tool 10" or "downhole tools 10") disclosed herein. Please note that same reference numbers represent same or like parts and/or components throughout the figures of the present disclosure. In one or more embodiments, the downhole tool 10 has, includes, comprises, or consists of at least one NMR sensor 12 (hereinafter "sensor 12"), high-power electronics 14 (hereinafter "electronics 14"), and/or low-power electronics and at least one NMR spectrometer 16 (collectively referred to hereinafter as "spectrometer 16") as shown in FIG. 1.

The downhole tools 10 disclosed herein are sized, shaped, adapted, and/or configured to measure, determine, and/or monitor lithium concentrations based on NMR measurements acquired by the downhole tools 10. The methods disclosed herein utilize the downhole tools 10 by deploying the downhole tools in at least one borehole or wellbore 18 (hereinafter "borehole 18" or "boreholes 18") as shown in FIGS. 2A, 2B, 3A, 3B, 4, 5A, and 5B. Additionally, the methods disclosed herein measure, determine, and/or monitor lithium concentrations of brines in the borehole 18 and/or at least one reservoir and/or at least one surrounding subterranean formation 20 (collectively referred to hereinafter at "formation 20" or "formations 20") as shown in FIGS. 2A, 2B, 3A, 3B, 4, 5A, and 5B. Further, the downhole tools 10 disclosed herein measure, determine and/or monitor the lithium concentrations based on NMR measurements downhole in the boreholes 18 which are, include, comprise, or consist of the lithium wells. In some embodiments, the methods disclosed herein may dispose, deploy, and/or position the downhole tools 10 in the lithium wells, may measure, determine, and/or monitor the lithium concentrations based on the NMR measurements, and/or may interpretate and analysis one or more measurements, data, and/or one or more electronic signals (collectively referred to hereinafter as "signal" or "signals") acquired and/or collected downhole by the downhole tools 10 to measure, determine, and/or monitor the lithium and/or different nuclei concentrations in the boreholes 18, the formations 20, and/or the lithium wells.

In one or more embodiments, a reservoir fluid and/or a borehole fluid 23 (collectively referred to hereinafter as "fluid 23" or "fluids 23") disposed within the boreholes 18, the formations 20, and/or the lithium wells comprise lithium-rich brine and/or brine rich with different nuclei. Further, the downhole tools 10 and methods disclosed herein may measure a lithium concentration of a brine directly in the formation 20 prior to, for example, at least one production stage, such as, during an exploration, an evaluation stage, or combination thereof. Additionally, the downhole tools 10 and methods disclosed herein may measure at least one lithium concentration measurement of the fluids 23 inside the boreholes 18, the formations 20, and/or the lithium wells. In at least one embodiment, the downhole tools 10 and methods disclosed herein may continuously measure, determine, and/or monitor of at least one lithium concentration in at least one subsurface brine produced from the borehole 18, the formation 20, the lithium well, or at least one specific zone within the lithium well. In some embodiments, the lithium well being monitored by the downhole tool 10 may be at least one part or portion of at least one network of producing wells to be monitored and/or may contribute to at least one blended brine feed for at least one facility. In an embodiment, the at least one facility may be at least one surface Direct Lithium Extraction facility. In one or more embodiments, the downhole tools 10 and methods disclosed herein may measure, determine, and/or monitor at least one lithium concentration downhole for one or more reservoir quality evaluations. In at least one embodiment, the downhole tools 10 and methods disclosed herein may interpretation and/or analyze at least one signal acquired downhole by the downhole tools 10 with a fringe field measurement of lithium concentrations in a brine. In an embodiment, the downhole tool 10 may be, have, include, comprise or consist of at least one 'inside-out' geometry NMR tool which or any geometry with a fringe field measurement of lithium concentrations in a brine.

Figure 2A:
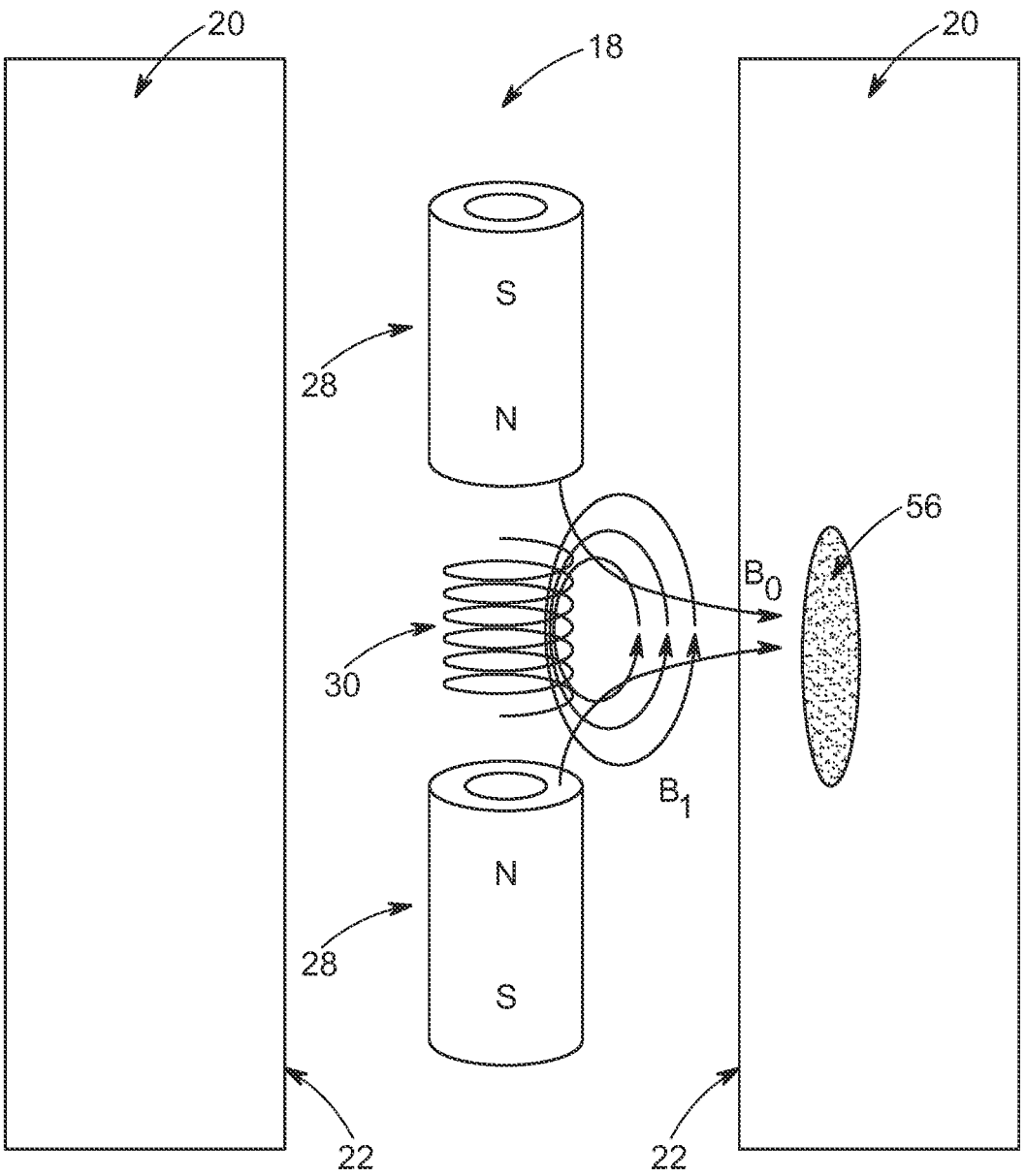
FIG. 2A illustrates a side view of a NMR-based open-hole formation evaluation tool having a centralized inside-out NMR tool geometry, according to one or more embodiments of the present disclosure.
Figure 2B:
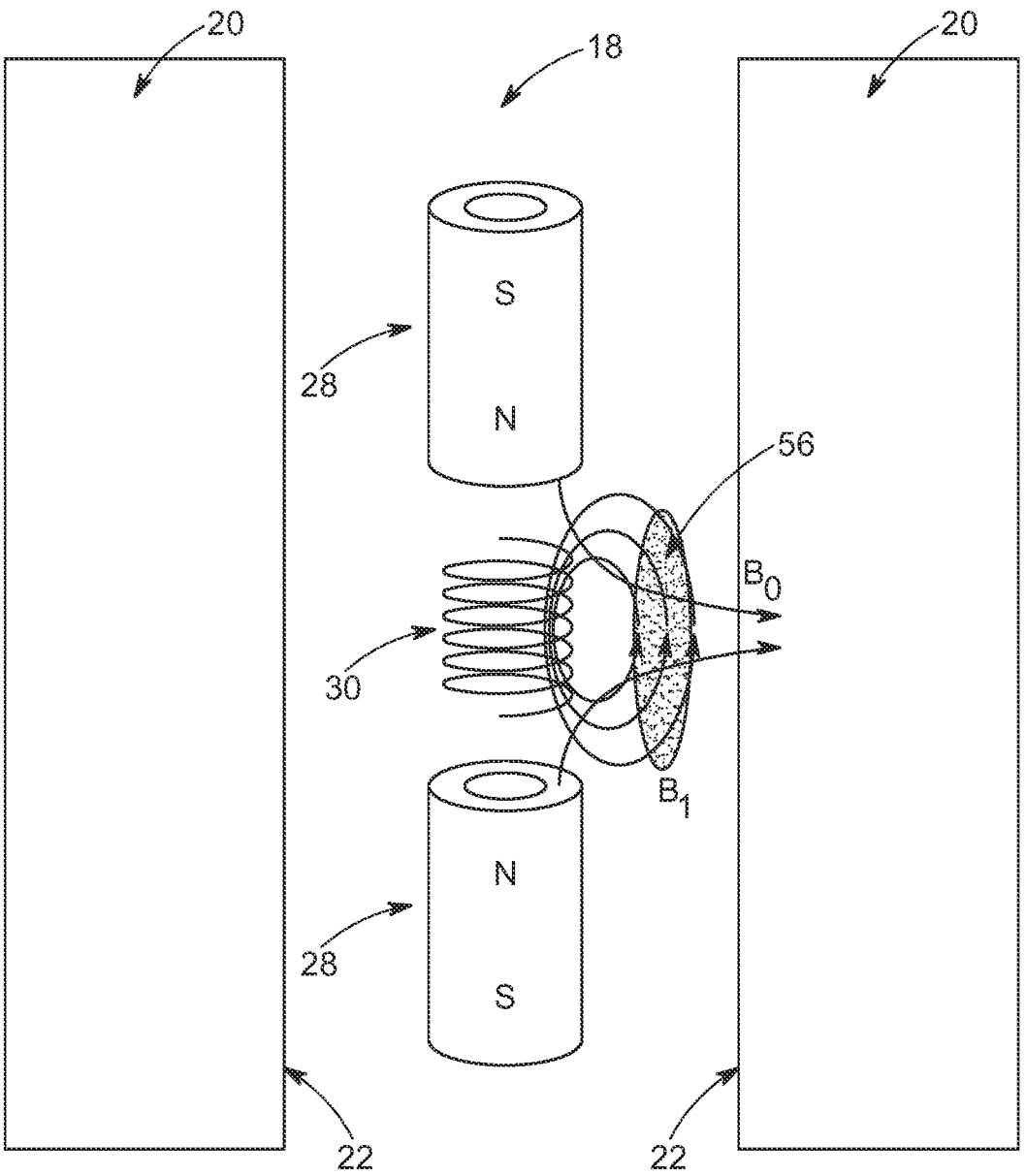
FIG. 2B illustrates a side view of a NMR-based open-hole wellbore evaluation tool disclosed herein having a centralized inside-out NMR tool geometry, according to one or more embodiments of the present disclosure.
Figure 4:
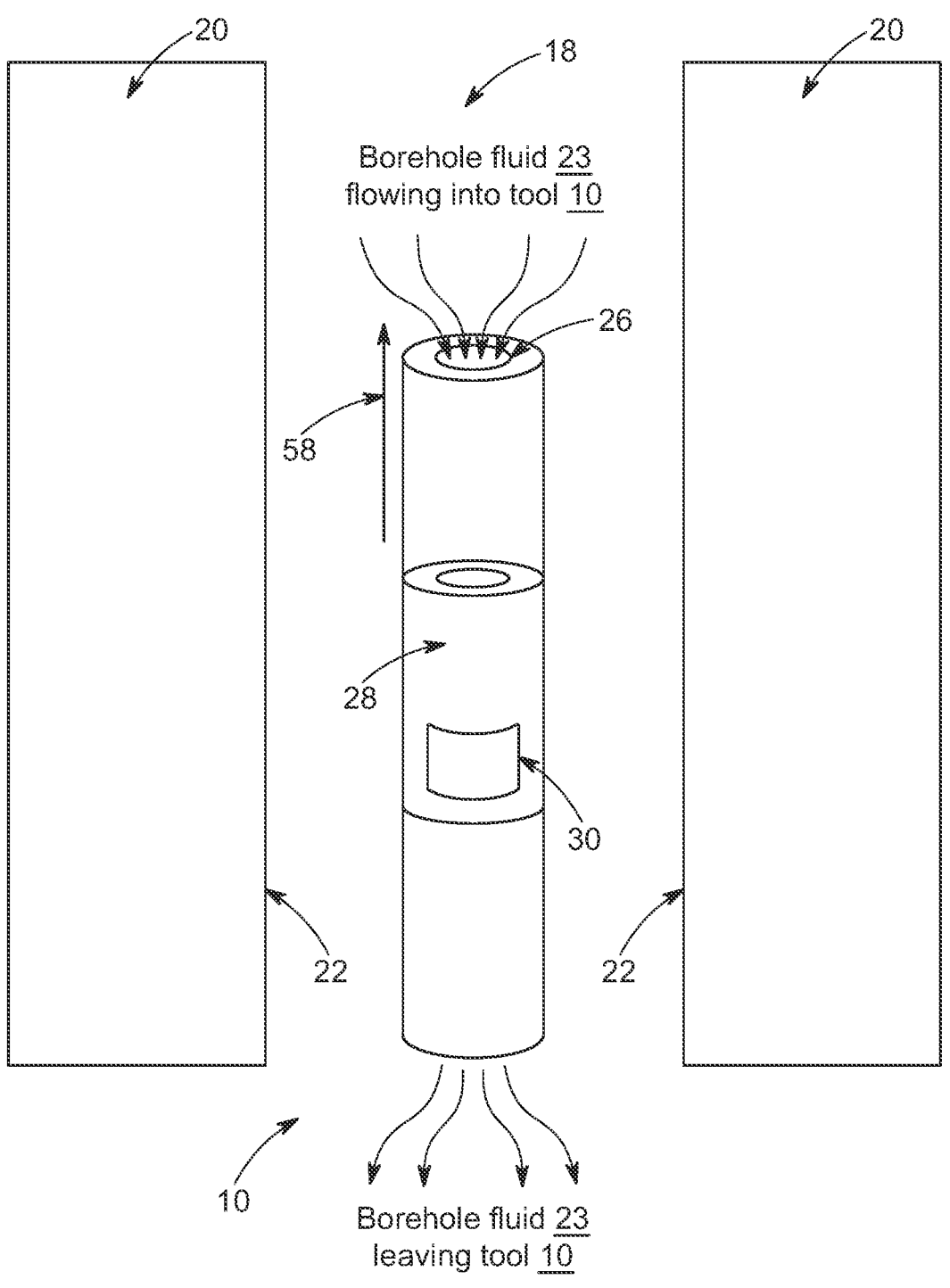
FIG. 4 illustrates a side view of a NMR-based logging wellbore evaluation tool disclosed herein and having a flow-through NMR tool geometry, according to one or more embodiments of the present disclosure.

In some embodiments, the downhole tools 10 disclosed herein are sized, shaped, configured, and/or adapted for lithium concentration measurements directly in the formation 20 based on NMR measurements in the open (uncompleted) hole. In some embodiments, the downhole tools 10 disclosed herein may be sized, shaped, configured, and/or adapted for lithium brine production well monitoring based on NMR measurements in the borehole 18, or a combination thereof. In at least one embodiment, the downhole tools 10 may be, include, comprise or consist of one or more wireline open-hole NMR tools that are tuned specifically to lithium resonant frequency, one or more production logging (hereinafter "PL") wireline tools configured for oil & gas applications and tuned specifically to lithium resonant frequency, one or more permanently installed tools that may be stand alone or mounted on at least one element of completion hardware and/or other downhole hardware. In an embodiment, the completion hardware and/or other downhole hardware may be, comprise, or consist of one or more artificial lift pumps. In some embodiments, the downhole tools 10 may be, include, comprise, or consist of a downhole formation fluid sampling tool that may be attachable to the wall 22 of the borehole 18 as shown in FIGS. 2A, 2B, and 4 and/or may pump reservoir fluid and/or borehole fluid 23 (collectively referred to hereinafter as "fluid 23" or "fluids 23") comprising lithium-rich brine into the downhole tool 10 where its lithium content may be measured with NMR. In an embodiment, the downhole formation fluid sampling tool may be similar or substantially similar to the current at least one modular dynamic tester.

In one or more embodiments, the downhole tools 10 and methods disclosed herein may be, include, comprise, or consist of at least one open-hole logging tool that has, includes, uses, comprises, or consists of the sensor 12 that is tuned to lithium resonant frequency to measure, determine, and/or monitor the lithium concentration in the formation 20 near the borehole 18. In at least one embodiment, the downhole tools 10 and methods disclosed herein may be, include, comprise, or consist of at least one production logging tool that has, includes, uses, comprises, or consists of the sensor 12 tuned to lithium resonant frequency to measure, determine, monitor the lithium concentration in at least one co-mingled flow inside the borehole 18. In some embodiments, the downhole tool 10 may be operated in a continuous logging mode being pulled on an electrical cable as the downhole tool 10 may measure the lithium concentration in the borehole fluid 23 inside the borehole 18. By doing the measurement downhole rather than at the surface, the lithium brine quality coming from different zones of the lithium well may be assessed in-situ as the downhole tool 10 passes by those different zones of the lithium well. A surface measurement on the other hand may only yield the overall concentration of the co-mingled brines from those different zones of the lithium well. This may be important both for reservoir quality evaluation during the exploration phase as well as for subsequent monitoring of the various zone production quality evolution with time.

In one or more embodiments, the downhole tools 10 and methods disclosed herein may be, have, include, comprise, or consist of at least one permanently installed downhole NMR sensor tuned to lithium resonant frequency to measure, determine, and/or monitor the lithium concentration in the borehole fluid 23 either in the borehole 18 already or entering the borehole 18 from a given zone of the lithium well. The downhole tool 10 may be permanently attached to at least one element of the completion hardware or other downhole hardware already present in the lithium well or can be stand-alone. In at least one embodiment, a plurality of NMR monitors may be installed at, near, and/or adjacent to various production zones of the lithium well.

In some embodiments, the downhole tools 10 and methods disclosed herein may be, have, include, comprise, or consist of at least one formation testing fluid sampling tool with an NMR module tuned to the lithium nuclear frequency that measures the lithium concentration in the borehole fluid 23 pumped into at least one interior tool chamber of the downhole tool 10 and/or at least one sampling bottle or at least one flow tube of the downhole tool 10. Various modes of using NMR to measure lithium concentrations downhole may require at least one measurement in one or more inhomogeneous fields. This may have an effect of stimulating not only lithium nuclei, but potentially also other nuclei present in the brine of the lithium well. In an embodiment, the other nuclei present in the brine may be, include, comprise, or consist of hydrogen, sodium or a combination thereof. The signal(s) from these nuclei needs to be separated from the lithium signal. The downhole tool 10 and methods disclosed herein may separate the lithium signal by examining one or more relaxation distributions of the total acquired signal and utilizing the fact that lithium relaxation times are much longer than those for hydrogen or sodium in the brine of the lithium well. In some embodiments, the methods disclosed herein may interpret and/or analyze the acquired signal(s) based on relaxation time distributions to separate the lithium signal from confounding signals deriving from other hydrogen and/or sodium nuclei.

In one or more embodiments, the downhole tools 10 and methods disclosed herein may measure, determine, and/or monitor lithium concentration downhole for at least one lithium brine reservoir evaluation as measured lithium concentration downhole may allow determinations of which zone(s) in a drilled well may produce and/or are producing high quality lithium brine and/or which zone(s) produce only water or low- or poor-quality lithium bearing brines or potable water. In some embodiment, the downhole tools 10 and methods disclosed herein may measure, determine, and/or monitor concentrations of lithium and/or other ions/ elements in brines and water, downhole for at least one lithium brine reservoir evaluation as the measured concentrations of lithium and/or other ions/elements may allow determinations of which zone(s) in a drilled well may produce or are producing high quality lithium brine and which zone(s) produce only low or poor quality lithium brine and/or portable water. The downhole tools 10 and methods disclosed herein may measure at least one lithium concentration by detecting the lithium nuclei directly and/or may measure a total amount of lithium nuclei within a predefined sensitive region.

In some embodiments, the methods disclosed herein may pump, deliver, and move borehole fluid 23 into the downhole tool 10 for measuring, determining, and/or monitor at least one lithium concentration downhole and inside the borehole 18. Additionally, the downhole tool 10 may be lowered into the borehole 18 on an electric cable that may deliver power to the downhole tool 10 as well as enabling surface-to-tool communications and data transfer. The downhole tool 10 may be pushed against the formation 20 via one or more pistons and/or calipers or another mechanism and/or may attach to the wall 22 of the borehole 18 with one or more packers 24, as shown in FIG. 5B, or another means to seal off the pumping area. In at least one embodiment, one or more attachment points, which may be optimized one or more hydraulics, may push the downhole tool 10 against the formation 20. Further, the borehole fluid 23 may be pumped out of the formation 20 and/or into at least one internal tube, at least one center tube, and/or at least one flow line 26 (collectively referred to hereinafter as "flow line 26") of the downhole tool 10 as shown in FIGS. 2A, 2B, 4, 5A, and 5B. Still further, the flow line 26 may then lead to one or more sample collection chambers of the downhole tools 10 where samples from different points can be collected. In at least one embodiment, the flow line 26 may lead back out to the borehole 18 and/or the borehole fluid 23 extracted from the formation 20 may be pumped out.

Figure 7:
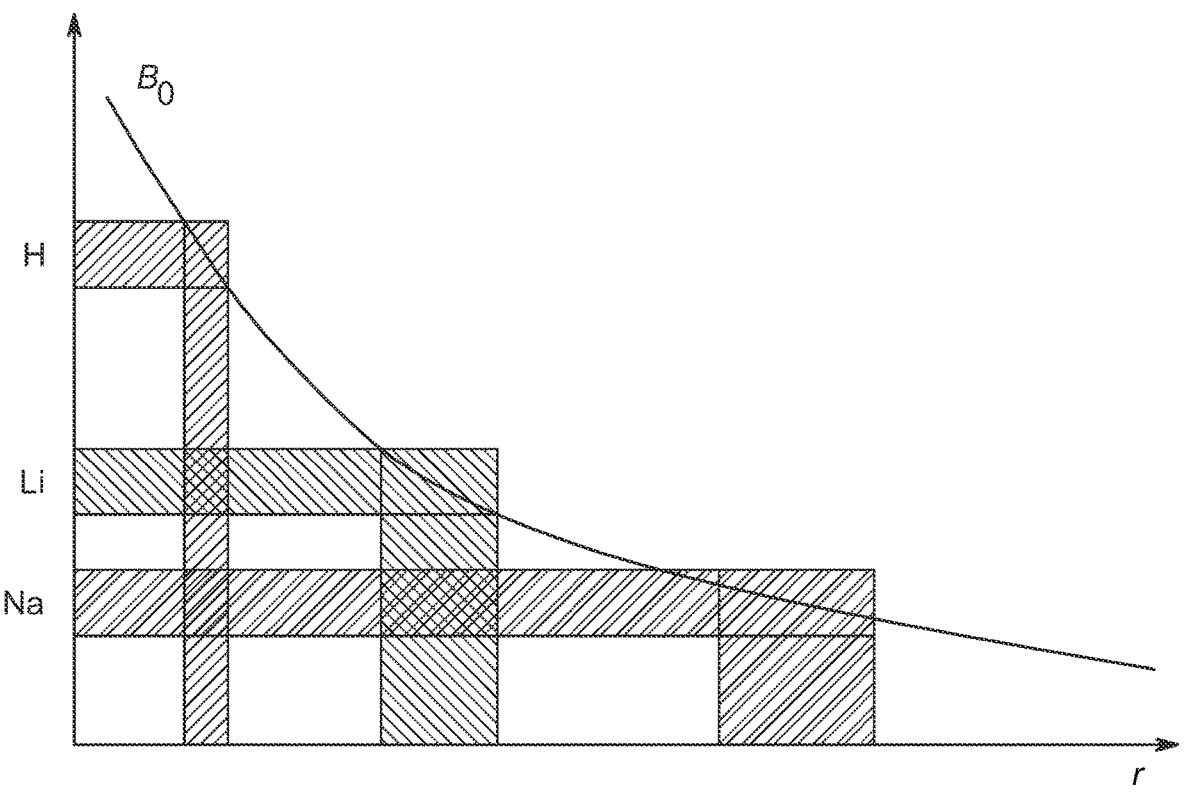
FIG. 7 is a graphical representation of why an inhomogeneous magnetic field ($B_0$ varies with distance from magnet r) will cause activation of different nuclei from different regions of the sample, according to one or more embodiments of the present disclosure.

In one or more embodiments, the downhole tools 10 and methods disclosed herein may have one or more regions in at least one space of the downhole tools 10 where at least one sample, comprising one or more lithium bearing brines, may be present and/or disposed or positioned therein while both static and the radiofrequency (hereinafter "rf") magnetic fields may be inhomogeneous. As a result of this inhomogeneity, because each nucleus will resonate at a different field strength when stimulated with the same frequency rf pulse, NMR-active nuclei other than lithium may be excited in different regions (e.g. different depths in the formation) filled with the sample and/or may contribute to the total measured signal. Depending on a tool design of the downhole tool 10 and/or on the composition of the brine, those other nuclei contributions may be quite large and/or may even dwarf the actual contribution of lithium nuclei which may be the signal of interest. This signal contamination may be particularly significant in the case of hydrogen and sodium nuclei which are likely to be abundant in most brines. Chlorine is also NMR active but with very low sensitivity meaning the NMR signal from chlorides may be unlikely to interfere with the measurement(s). FIG. 7 illustrates that interference may happen in one or more inhomogeneous fields while the interference may not happen in one or more laboratory-style highly homogenous field configurations.

As shown in FIG. 1, the sensor 12, the electronics 14, and/or the spectrometer 16 of the downhole tool 10 may be connected, attached, and/or coupled to each other such that the sensor 12, the electronics 14, and/or the spectrometer 16 may be in electronic and/or digital communication with each other. As a result, the signals acquired and/or collected downhole may be transmitted and/or delivered from the sensor 12 to the electronics 14 and/or the spectrometer 16 and/or between the electronics 14 and the spectrometer 16.

In one or more embodiments, the sensor 12 disclosed herein may have, include, comprise, or consist of one or more magnets 28 (hereinafter "magnet 28" or "magnets 28", shown in FIGS. 2A, 2B, 3A, 3B, 4, 5A, and 5B), at least one tuned RF coil 30 (hereinafter "coil 30") and/or at least one impedance transform 32 (hereinafter "transform 32") and/or the electronics 14 may have, include, comprise, or consist of at least one Q-switch 34 (hereinafter "switch 34"), at least one duplexer 36 (hereinafter "duplexer 36"), and/or at least one power amplifier 38 (hereinafter "amplifier 38"). Further, the spectrometer 16 may have, include, comprise, or consist of at least one low-noise amplifier 40 (hereinafter "LNA 40"), at least one receiver 42 (hereinafter "receiver 42"), at least one analog-to-digital converter (hereinafter "ADC 44"), at least one controller 46 (hereinafter "controller 46"), at least one host 48 (hereinafter "host 48"), at least one pulse sequencer 50 (hereinafter "sequencer 50"), at least one transmitter 52 (hereinafter "transmitter 52"), and/or at least one oscillator disposed between and in digital and/or electronic communication with the receiver 42 and the transmitter 52. In at least one embodiment, the sensor 12 may transmit and/or deliver the signals to the electronics 14 via the transform 32 of the sensor 12 and/or the switch 34 and/or duplexer 36 of the electronics 14. Further, the electronics 14 may transmit and/or deliver the signals to the spectrometer 16 via the duplexer 36 of the electronics 14 and/or the LNA 40 of the spectrometer 16. Still further the spectrometer 16 may transmit and/or deliver the signals to the electronics 14 via the transmitter 52 of the spectrometer 16 and/or the amplifier 38 of the electronics 14. Moreover, one or more pathways for the signals to and from and/or between the above-mentioned components of the downhole tools 10 may be set forth in the schematics of FIG. 1.

In some embodiments, the downhole tools 10 and methods disclosed herein comprise at least one NMR-based downhole tool having, comprising or consisting of the sensor 12, the electronics 14, and/or the spectrometer 16. Additionally, the sensor 12 may have, include, comprise, or consist of the coil 30, at least one magnetic yoke material, one or more rf-shielding materials, and/or one or more rf-focusing materials. The coil 30 may be, include, comprise or consist of one or more permanent magnetic alloys, one or more electromagnets, and/or one or more superconducting magnets. In at least one embodiment, the permanent magnetic alloys may be, comprise, or consist of samarium cobalt and/or neodymium iron boron. Further, the electronics 14 may be, include, comprise, or consist of one or more high-voltage power supplies and/or one or more high-power switches. Moreover, the spectrometer 16 may be, include, comprise, or consist of one or more pulse generators, one or more internal clocks, and/or one or more preamplifiers.

In one or more embodiments, a design, geometry and/or configuration of the coil 30 may define, determine, and/or define at least one sensitive region of the downhole tool 10 where the borehole fluid 23 may be measured. The coil 30 is or may be tuned to match a Larmor frequency of a nucleus of interest and/or the tuning of the coil 30 is or may be achieved and/or accomplished by a tuning method comprising at least adjusting an inductance and/or a capacitance or at least one detection circuit. Additionally, the tuning method for the coil 30 may further comprise at least connecting one or more capacitors and/or adjusting at least one cross-section area and/or adding one or more turns to the coil 30. In some embodiments, the tuning of the coil 30 may be done once the static magnetic field has been fixed by a design of the magnet 28. Lithium has two NMR active isotopes $^6$Li and $^7$Li, with natural abundances of 7.6% and 92.4% and gyromagnetic ratios of $\gamma=3.9371\times10^7$ and $10.398\times10^7$ rad s$^{-1}$ T$^{-1}$, respectively. The Larmor frequency is given by $\gamma$ B0 where B0 is the strength of the static magnetic field in units of Tesla or T. The frequency corresponding to either isotope may be used for the measurement although due to its much higher natural abundance, $^7$Li is the preferred target isotope. If other nuclei are to be measured, such as, for example, sodium (Na) or boron (B) or any NMR-active isotope of any nucleus in Table I below, the coil 30 may be tuned to their Larmor frequencies, respectively. In at least one embodiment, the downhole tool 10 and methods disclosed herein may be, have, include, comprise or consist of at least one multi-nuclear tool which may be built, constructed, manufacture, produce, and/or provided such that the tuning of the coil 30 may be switchable and/or automatically switched based on the desired or selected nucleus. A method for providing the at least one multi-nuclear tool may comprise at least switching in and out capacitor banks connected to the coil 30 which may change a circuit resonant frequency of the downhole tool 10. In some embodiment, the downhole tools 10 and methods disclosed herein may have, include, comprise, or consist of one or more multi-resonant coils which may be designed, configured, and/or adapted to have at least one resonance at one frequency corresponding to one nuclei of interest. In at least one embodiment, the nuclei of interest may be, comprise, or consist of one or more elements of interest as disclosed herein. In some embodiments, the one or more elements of interest for downhole NMR measurement(s), each with at least one NMR-active isotope and sufficient NMR receptivity to ensure a viable measurement(s) may be, comprise, include, or consist of at least one element of the following: copper; lithium; chlorine; cobalt; vanadium; uranium; iridium; manganese; boron; potassium; sodium; bromine; magnesium; terbium; europium; lanthanum; praseodymium; scandium; holmium; or lutetium.

Lithium NMR Open-Hole Logging Tools Having Centralized Inside-Out Geometry

In one or more embodiments, there are one or more high-level deployment options and/or one or more magnet-coil configuration options of the coil 30 for open-hole NMR lithium concentration measurement. Additionally, the downhole tool 30 may be deployed in a wireline-like mode and/or on a powered cable pulled by a winch at the surface, wherein power and/or communications may be provided via at least one cable and/or at least one surface computer. This deployment option (i.e., the wireline-like mode) may give a real-time measurement data and/or information to an operator at the surface. In some embodiments, the deployment option for the downhole tool 10 may be a slick-line like mode, wherein a cable does not provide power or communications but serves only as means of conveyance of the downhole tool 10. In slick-line like mode, the downhole tool 10 may be battery-operated and/or may acquire, collect, and/or record the measurements, information, and/r data on at least one internal memory which may be recovered later once the downhole tool 10 is pulled back up to surface. In at least one embodiment, the downhole tool 10 may be deployed on the drill string as in Logging While Drilling (hereinafter "LWD") tools with the tool power provided by mud flow and/or the turbine alternator and/or communications are transmitted via mud-pulse telemetry. In yet another deployment mode, the downhole tool 10 may be deployed via a Thrubit-like tool which may be battery operated like slick-line but may go through the drill bit and thus does not require the pulling out of the drill string. In one more embodiments, the downhole tool 10 may be deployed on a coiled-tubing-like conveyance or other means of lowering the downhole tool 10 downhole into the borehole 18. For these different conveyance modes, there may be more than one configuration for a geometry of the sensor 12 (i.e., the magnet and coil geometries and configurations) which may have, include, comprise, or consist of one or more multiple coils, one or more magnet sections, or combination thereof. In at least one embodiment, the geometry and/or configuration of the sensor 12 may have, include, comprise, or consist of the magnet 28 which may be combined with one or more ferrites and/or one or more high-magnetic-permeability materials and/or the coils 30 which may be shielded and/or may be focused on a particular region.

In some embodiments, the sensor 12, including magnet-coil geometry, and the electronics 14 as shown in FIG. 1 may be sized, shaped, configured, and/or adapted to work at the desired lithium frequency and/or optimized for maximum signal-to-noise ratio and minimum potential interference from other nuclei, such as, for example, hydrogen or sodium. Optimization of the downhole tool 10 may be achieved and/or realized via one or more optimization methods disclosed herein and/or the methods disclosed herein at least removing confounding signal(s) deriving from non-lithium nuclei, such as, for example, hydrogen and sodium.

In one or more embodiments, the downhole tools 10 may have, include, comprise, or consist of a centralized inside-out NMR tool geometry for borehole lithium concentration evaluations as shown in FIGS. 2A and 2B. Additionally, the downhole tools 10 may be open-hole logging tools config-ured for formation and wellbore evaluations as shown in FIGS. 2A and 2B, respectively, wherein the downhole tools 10 may be centered in the wellbore by means of bowsprings, calipers, or other mechanical fixtures and consist of two magnets in the Jasper-Jackson geometry with same poles facing each other and with a rf coil (i.e., coil 30) in the middle of or disposed between the two magnets. However, there may be one or more differences between the downhole tools 10 disclosed herein such that the downhole tools 10 achieve and realize at least one shift of at least one sensitive region 56 to the formation 20 as shown in FIG. 2A to the at least one sensitive region being inside of the borehole 18 as shown in FIG. 2B. First the coil 30 is or may be tuned to the lithium Larmor frequency rather than to the hydrogen which is the nucleus of choice for the known oil & gas applications. Second, the magnets 28 of the sensor 12 and the rf frequency is or may be configured such that the sensitive region 56 falls within the formation 20 or within the borehole 18 rather than in the formation 20. This configuration of the sensor 12 may maximize NMR signals such that the sensitive region 56 is or may be fully or all, or at least substantially all, contained within the formation 20. Having the sensitive region 56 fall or be disposed within the formation 20 allows the downhole tool 10 to measure, monitor, and determine at least one lithium concentration of the borehole fluid 23 disposed within the formation 20. Having the sensitive region 50 fall or be disposed within the borehole 18 is or may be achieved or accomplished via at least one optimization method fol-lowed when designing, producing, and/or providing the downhole tools 10 and/or the sensor 12. In at least one embodiment, the at least one optimization method includes or comprises at least varying an arrangement of the magnets 28 and a geometry of coil 30 so as to maximize NMR signals under the constraint that the sensitive region 56 be fully or all, or at least substantially all, contained within the borehole 18.

Lithium NMR Open-Hole Logging Tools Having Single-Sided Inside-Out Geometry

Figure 3A:
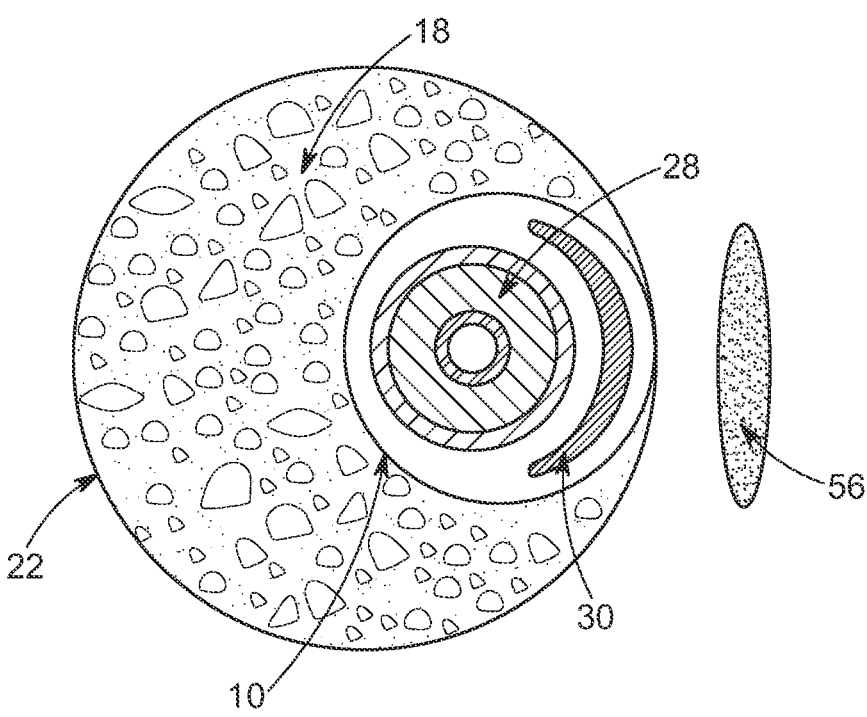
FIG. 3A illustrates a top view of a NMR-based open-hole wireline formation evaluation tool pressed against a borehole wall and having a single-sided inside-out NMR tool geometry, according to one or more embodiments of the present disclosure.
Figure 3B:
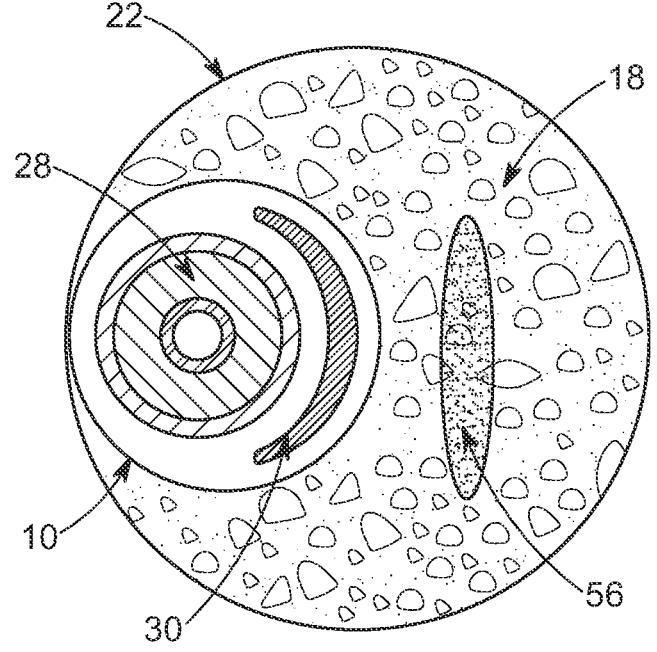
FIG. 3B illustrates a top view of a NMR-based open-hole wireline wellbore evaluation tool pressed against a borehole wall and having a single-sided inside-out NMR tool geometry, according to one or more embodiments of the present disclosure.

In one or more embodiments, the downhole tools 10 may have, include, comprise, or consist of a single-sided inside-out NMR tool geometry for borehole lithium concentration evaluation as shown in FIGS. 3A and 3B. In some embodi-ments, the downhole tools 10 are or may be open-hole wireline formation evaluation tools are pressed against the wall 22 of the borehole 18 with a caliper or a bow spring such that the magnetic fields project into the formation 20 as shown in FIG. 3A. The sensor 12 may be configured or have a configuration to maximize NMR signals such that the sensitive region 56 is or may be fully or all, or at least substantially all, contained within the formation 20. Having the sensitive region 56 fall or be disposed within the formation 20 allows the downhole tool 10 to measure, monitor, and determine at least one lithium concentration of the borehole fluid 23 disposed within the formation 20 as shown in FIG. 3A. In other embodiments, the downhole tool 10 and methods disclosed herein may direct the downhole tool 10 with the magnet 28 and an antenna side of the downhole tool 10 towards the borehole 18 rather than towards the formation 20 such that the sensitive region 56 may be disposed, positioned, located, or resided fully or substantially fully within the borehole 18 as shown in FIG. 3B. In an embodiment, the methods disclosed herein dispose or position the entirety of the sensitive region 56 within the borehole 18 and/or comprise the field direction of the sensor 12 vis-à-vis the wall 22 of the borehole 18. In at least one embodiment, the present methods disclosed herein include or comprise at least utilizing detailed modeling and optimi-zation to optimize geometries of the magnet 28 and the coil 30 and/or maximize the NMR signal under the specific hardware constraints.

Lithium NMR Open-Hole Logging Tools Having Flow-Through Configurations

In known laboratory systems, a sample is placed inside the known magnet and coil assembly, the nuclear spins are polarized by the magnetic time during a multiple of the spin-lattice T1 relaxation time, and then the NMR measure-ment is performed. In contrast, the downhole tool 10 and methods disclosed herein have, comprise, or may have or comprise at least one flow-through NMR tool configuration and/or geometry and/or is pulled or may be pulled upwardly as shown in FIG. 4. As a result of the upward movement, borehole fluid 23 will or may enter the flow line 26 of the downhole tool 10 and/or reach or may reach the magnet-coil assembly comprising the magnet 28 and the coil 30. The flow(s) of the borehole fluid 23 can or may be stopped and/or one or more measurements are or may be performed. For a total scan efficiency and/or a vertical resolution of the one or more measurements as well as for mechanical simplicity, it may be preferable to have a continuous measurement with-out stopping the flow(s) of the borehole fluid 23. This is or may be similar to a continuous-logging mode of other downhole tools. To implement the continuous logging mode in this flow-through configuration, the magnet 28 extends or may need to extend beyond the coil 30 upward in the direction 58 of the entering borehole fluid 23 to allow the borehole fluid 23 to have time to get or become polarized, or at least partially polarized, prior to entering the coil 30 of the downhole tool 10 where the one or more rf pulses may be applied and/or at least signal may be acquired. The flow-through configuration as shown in FIG. 4 may have an advantage of ensuring a homogeneous field inside the flow line 26 with the effect of amplifying the NMR signal and/or giving high nuclear specificity by minimizing signal con-tamination from other nuclei that are or may be activated somewhere within the borehole fluid 23.

For one or more of the designs and/or configurations of the downhole tool 10 as shown in FIGS. 2A, 2B, 3A, 3B and/or 4, the downhole tool 10 may not or will not see all the borehole fluid 23 present and/or passing through the borehole 18. Instead, the downhole tool 10 will only see or may see a small portion of the borehole fluid 23 within the sensitive region 56 determined by the magnet-coil configuration comprising the magnet 28 and the coil 30. In the case of the flow-through tool design and/or configuration shown in FIG. 4, the sensitive region is visibly demarcated by the size of the flow line 26. In order for the measurement to be representative of the average lithium concentration in the entire borehole 18, it must be ensured that the borehole fluid 23 within the sensitive region 56 is or may be representative of the average fluid. In at least one embodiment, this may be accomplished by using at least one flow mixer (not shown in the drawings) which may disposed, placed, or positioned ahead of the downhole tool 10 as the downhole tool 10 is being pulled or may be pulled upwards within the borehole 18. Implementing flow mixing is or may be relevant and/or important in one or more inclined wells where density segregation may occur for brines and/or the borehole fluid 23 which may arrive from one or more different zones of the formation 20. But even in one or more vertical wells, homogenizing the borehole 18 may be relevant and/or important given how small one or more cross-sections of the sensitive regions 56 are likely to be relative to the size of the borehole 18. In some embodiments, there may be one or more many different types of flow mixers that may be sized, shaped, configured, and/or adapted for homogenizing flow in the borehole 18. In at least one embodiment, one or more flow mixers may have, include, comprise, or consist of one or more fins, one or more propellers, one or more spirals, and/or other structural features, components, and/or designs that may swirl and mix the flow of the borehole fluid 23 passively or actively and/or may be disposed, placed, or positioned ahead of the downhole tool 10 on at least one tool housing and/or on at least one housing of at least one other downhole tool in front of the downhole tool 10.

For one or more of the designs and/or configurations of the downhole tool 10 as shown in FIGS. 2A, 2B, 3A, 3B and/or 4, a number of different acquisition modes may be used to acquire NMR data, information, and/or measurements. In some embodiments, at least one acquisition mode of the downhole tool 10 as shown in FIGS. 2A, 2B, 3A, 3B, and/or 4 may include: at least one total signal measurement via the FID or spin echo or Hahn echo or inversion recovery pulse sequence or any variants thereof; or one or more T1 and T2 relaxation measurements, via for instance, CPMG pulse sequence or any variant thereof; and/or one or more 2D NMR techniques deployed in the Oil & Gas sector for NMR interpretation.

Lithium NMR Permanently Mounted Downhole Tools

In one or more embodiments, the downhole tool 10 disclosed herein may be a downhole NMR tool and/or the methods disclosed herein may utilize, emblement, and/or deploy the downhole NMR tool, wherein the downhole NMR tool is or may be permanently connected, coupled, attached, and/or secured to completion hardware and/or other downhole hardware. In at least one embodiment, the downhole NMR tool may be or is permanently connected, coupled, attached, and/or secured to, for example, at least one artificial lift and/or at least electrical submersible pump 60 (hereinafter "ESP 60"), as shown in FIG. 5A.

Figure 5A:
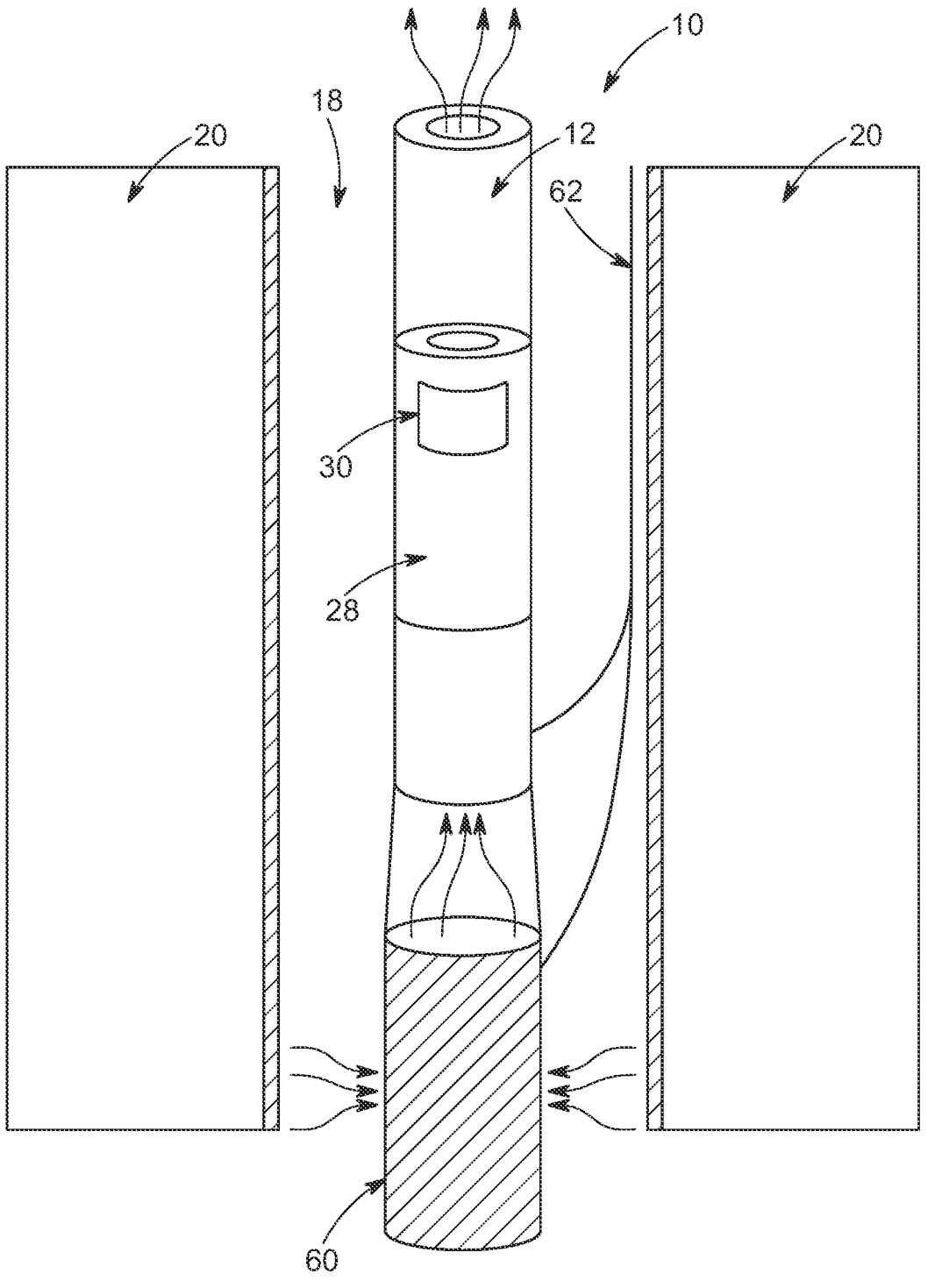
FIG. 5A illustrates a side view of a NMR-based permanent downhole wellbore evaluation tool attachable or connectible to an electrical submersible pump, according to one or more embodiments of the present disclosure.
Figure 5B:
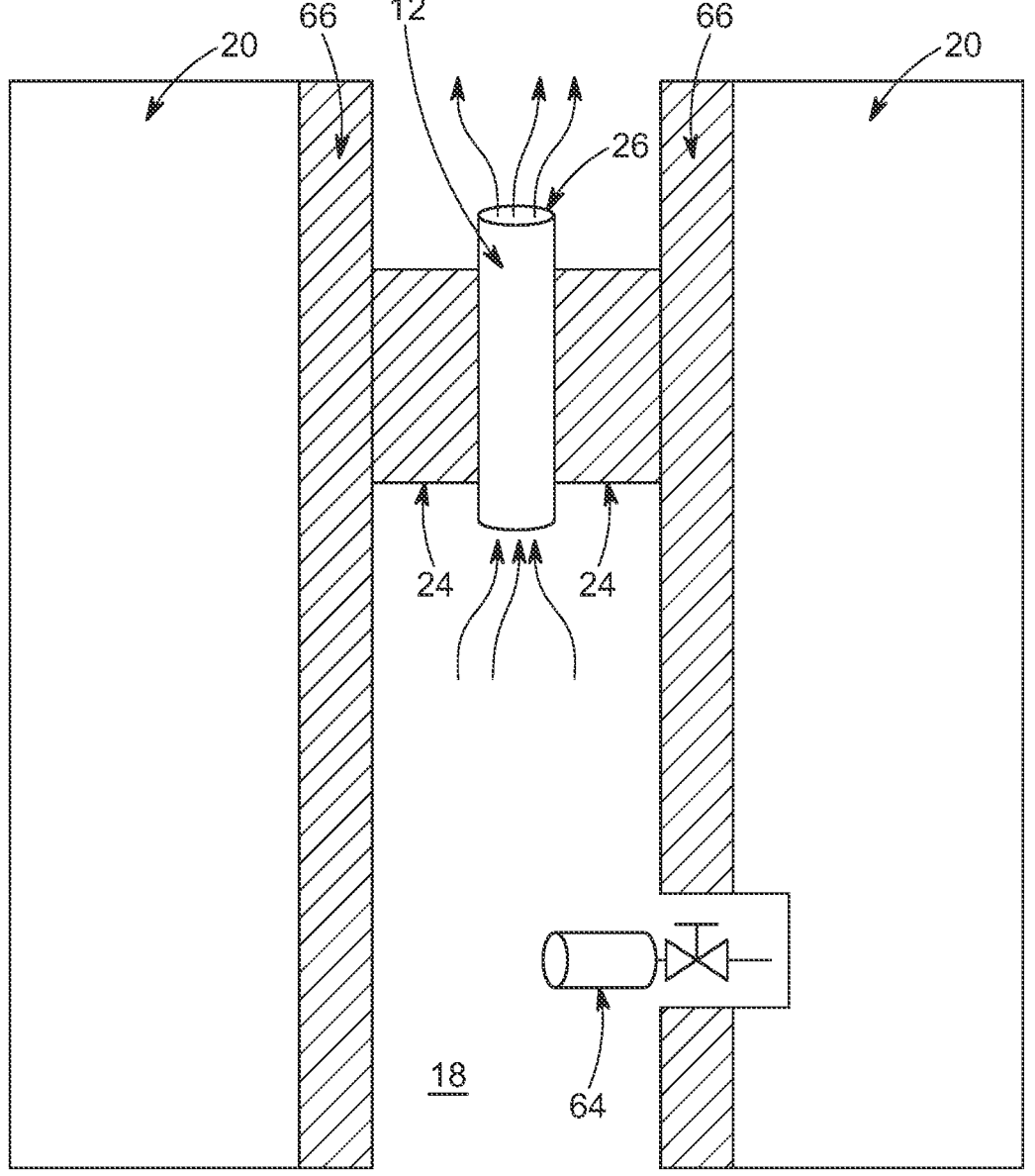
FIG. 5B illustrates a side view of a NMR-based permanent downhole wellbore evaluation tool attachable or connectible to one or more completion elements, according to one or more embodiments of the present disclosure.

In some embodiments, at least one sensor configuration for at least one permanently mounted downhole application may be, include, comprise, or consist of the sensor 12 in the form of a flow-through sensor, wherein the magnet 28 and the coil 30 surround or substantially surround the flow line 26 as the borehole fluid 23 may flow through the flow line 26, as shown in FIGS. 5A and 5B. The at least one sensor configuration generates or may generate superior and/or improved field homogeneity and/and superior and/or improved signal-to-noise ratio, which is or may be critical, relevant, or important for a superior and/or improved NMR measurement. In at least one embodiment, the sensor 12 is or may be at least one part of or mounted on downhole hardware; therefore, steel may be in near proximity to the sensor 12. This near proximity of the sensor 12 and the steel would adversely or may adversely affect the quality of the measurement in the case of an inside-out sensor design wherein the field is projected outside the downhole tool.

In one or more embodiments, the sensor 12 may be, include, comprise, or consist of a permanently installed downhole NMR sensor and/or may be powered from the surface via an electrical cable 62 as shown in FIG. 5A. In at least one embodiment, the ESP 60 may be installed to provide artificial lift to the borehole fluid 23 and power from the surface may be provided, transmitted, or delivered via the electrical cable 62. As indicated in FIG. 5A, the same power source (i.e., electrical cable 62) may be used to power the sensor 12 disposed within the borehole 18.

In at least one embodiment, the sensor 12 and/or tool 10 may be, include, comprise, or consist of at least one NMR flow-through sensor that may be tuned to a lithium frequency and/or connected, coupled, attached, and/or secured to a top of the ESP 60 and/or power may be received, transmitted, and/or delivered from the electrical cable 62. In an embodiment, the ESP 60 and the sensor 12 is or may be mounted above the pay-zone of interest (i.e., the zone of the formation 20 from which the lithium-rich brine or borehole fluid may be flowing. In addition to providing lift, the ESP 60 may be or serve as the fluid homogenizer before the borehole fluid 23 enters the sensor 12 which may be relevant and/or important to ensure that the measured brine sample is representative of the overall borehole flow of the borehole fluids 23 in the borehole 18. As indicated in FIG. 2A, the magnet 28 may extend down below the coil 30 and/or provide prepolarization of the lithium nuclei before the lithium nuclei may enter the coil 30. As a result, the brine and/or borehole fluid 23 within the sensitive region 56 may fully or at least partially polarized which may be essential, important, and/or relevant to a quantitative assessment. In some embodiments, the same or substantially the same arrangement (i.e., the magnet 28 extending past the coil 30 in the direction against the flow of the borehole fluid 23) holds or may hold for tool localization whether on the ESP 60, on at least one packer 24, at least one valve 66, or one or more other completion elements as shown in FIGS. 5A and 5B. In one or more embodiments, FIG. 5B shows potential localization of the sensor 12 on different completion elements. In an embodiment, the sensor 12 may be mounted on and/or connected, coupled, attached, and/or secured to at least one packer 24 and/or may be integrated into at least one packer design (not shown in the drawings). In some embodiments, the sensor 12 may be mounted on at least one valve 64 if present for controlling flow from a zone of the formation 20, and/or on one or more completion elements. In an embodiment, the sensor 12 may be integrated into at one completion element. Further, completion tubing or casing 66 may be disposed, positioned, and/or located between the formation 20 and the at least one packer 24 as shown in FIG. 5B.

In some embodiments, one or more details and/or specifications of the geometry of the sensor 12 may vary to accommodate one completion style and/or one borehole size. Further, the one or more details may comprise or consist of a width of the flow path 26, an amount of magnet material, a packaging of the electronics 14, and/or a packaging of power supplies. Still further, one or more NMR systems (i.e., the sensor 12 or the downhole tool 10 comprise the sensor 12) disclosed herein may be scalable in a sense that at least one same basic design may be made larger or smaller depending on one or more details of the downhole application. In an embodiment, parameter optimization may need to be performed for each specific location. For one or more of the designs and/or configurations of the downhole tool 10 as shown in FIGS. 5A and/or 5B, a number of different acquisition modes may be used to acquire NMR data, information, and/or measurements. In some embodiments, at least one acquisition mode of the downhole tool 10 as shown in FIGS. 5A and/or 5B may include: at least one total signal measurement via the FID or spin echo or Hahn echo or inversion recovery pulse sequence or any variants thereof; or one or more T1 and T2 relaxation measurements, via for instance, CPMG pulse sequence or any variant thereof; and/or one or more 2D NMR techniques deployed in the Oil & Gas sector for NMR interpretation.

Lithium NMR Downhole Formation Fluid Sampling Tools

Figure 6:
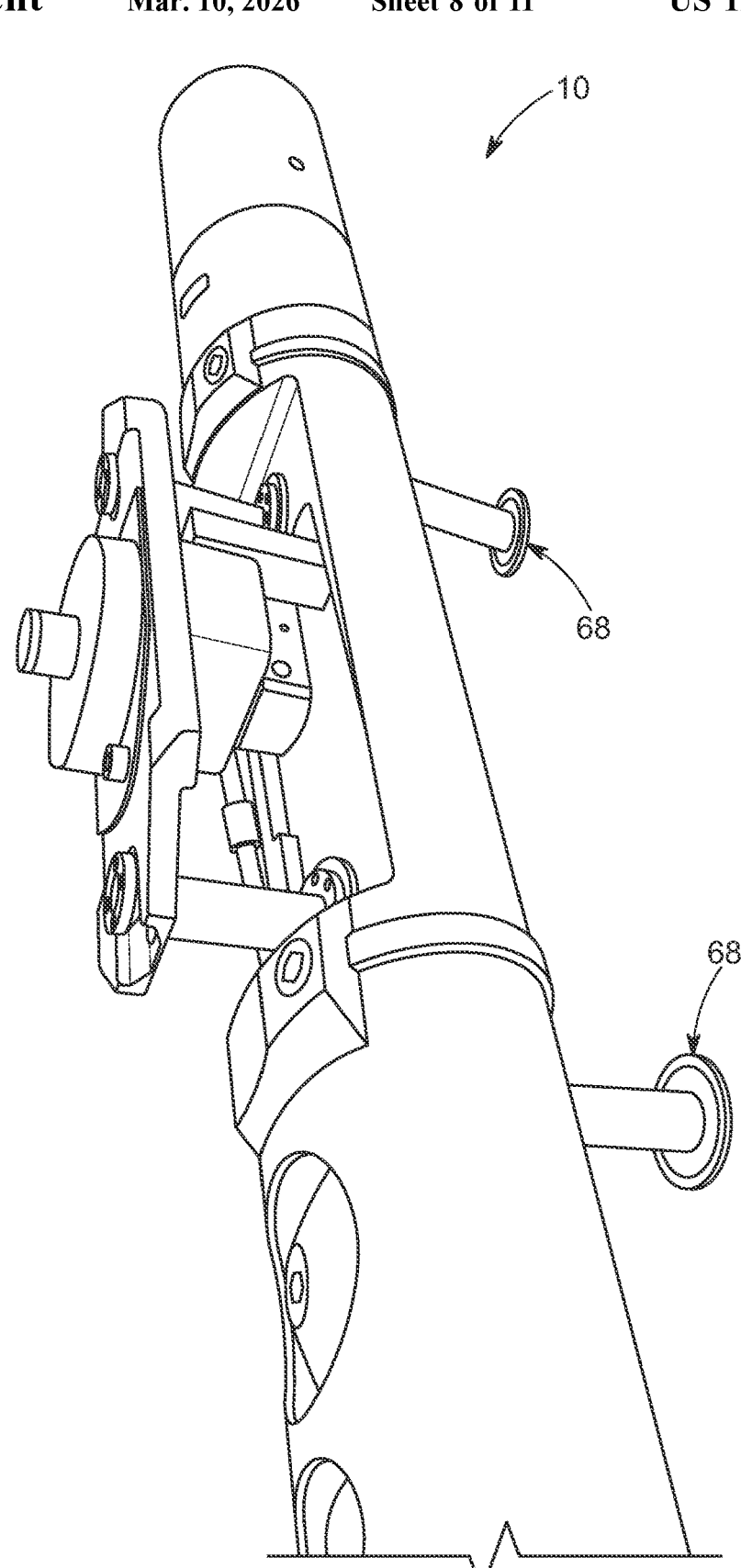
FIG. 6 illustrates a perspective view of a NMR-based downhole formation fluid evaluation and sampling tool having at least one mechanism for attaching or connecting the tool a borehole wall, according to one or more embodiments of the present disclosure.

In one or more embodiments, downhole measuring the concentration of lithium, or other ions/elements in brines, water, and/or borehole fluid 23 may be relevant and/or important for lithium brine reservoir evaluation as the downhole measured concentration of lithium allows or may allow at least one determination of which zone(s) in a drilled well (i.e., borehole 18) may produce high quality lithium brine and which zone(s) may produce only low- or poor-quality lithium brine or portable water. In some embodiments, the downhole tool 10 is or may be lowered into the drilled well or the borehole 18 on the electrical cable 62 that may deliver power to the downhole tool 10 and/or enable surface-to-tool communications and data transfer. The downhole tool 10 is or may be pushed against the formation 20 via pistons and/or calipers 68 (collectively referred to hereinafter as "piston 68" or "pistons 68") as shown in FIG. 6 or another mechanism and/or may attach to the wall 22 of the borehole 18 with the packer 24 or another means to seal off the pumping area within the borehole 18. In at least one embodiment, the downhole tool 10 may utilize one or more attachment points to optimize the hydraulics. The borehole fluid 23 is or may be pumped out of the formation 20 and into the flow line 26. The flow line 26 leads or may lead to one or more sample collection chambers where samples from different points can be collected. In an embodiment, the flow line 26 leads or may lead back out to the borehole 18 and/or the borehole fluid 23 extracted from the formation 20 is or may be pumped out.

In some embodiments, one or more NMR measurements are or may be performed on the borehole fluid 23, once the borehole fluid 23 is or may be inside the downhole tool 10, at one or more different points of the flow path, which may include the flow line 26 itself, one or more sample collection bottles, at an inlet, at an outlet, in multiple places or points, or a combination there. The geometry of the magnet 28 and the coil 30 defines or may define the sensitive region 56 of the downhole tool 10 where the borehole fluid 23 is or may be actually measured. In some embodiments, at least one configuration for this application is or may be the centered-tube geometry where the magnet 28 and the coil 30 surround the sample which is or may be the borehole fluid 23 pumped by at least one pump module. The preferred implementation of the flow tube 26 may be made from at least one non-magnetic and non-metallic material such that both the static magnetic field as well as rf fields may penetrate to the inside of the flow tube 26 without much degradation. In at least one embodiment, the at least one non-magnetic and non-metallic material may be, for example, at least one ceramic, at least one polycarbonate, at least one thermoplastic, Teflon, glass, or a combination thereof. The at least one configuration may be optimal for generating, producing, and/or providing a uniform static magnetic field and strong rf field which may be necessary to generate a detectable NMR signal. In some embodiments, the magnet 28 may be at least one Halbach style magnet or other magnet configuration and/or the coil 30 may have at least one geometry such that the generated rf is orthogonal to the static field of the magnets 28 within the measurement area. In an embodiment, the magnet-coil configuration comprising the magnet 28 and the coil 30 may be a single-sided design wherein the magnet 28 and the coil 30 do not surround the sample but generate the static and rf fields that are inhomogeneous inside the sample. Further, the measurement may be difficult or more difficult due to lower signal strength and potential signal contamination from other nuclei.

In one or more embodiments, the NMR sensing unit (i.e., the sensor 12 comprising the coil 30 and the magnet 28 in a geometry) may be located along the pumped fluid path, mounted around the flow tube 26 at any point, at any sample collection chamber if present, at an inlet, at an outlet, at any bypass tube if present, or a combination thereof. The measurement may be performed while the borehole fluid 23 is being or may be pumped and/or flowing but at the cost of significant complication of both the sensor design and measurement interpretation. As a result of significant complication, a different sensor design from the standard laboratory systems may be required (i.e., at least one downhole tool with the magnet 28 stretching out significantly beyond the coil 30 in the direction of the flowing borehole fluid 23 to prepolarize the nuclear spins before they enter the coil section. Further, the coil 30 may need to be longer to capture the fluid signal while the rf pulses are being or may be applied. Still further, the interpretation may need to account for the loss of signal due to the rf-activated magnetization flowing out of the sensitive region 56 during the measurement. Moreover, one or more different data acquisition schemes may be used depending on the rate of flow.

In some embodiments, at least one easier mode of operation may be the stop-and-measure mode where the flow is stopped during the NMR measurement which could take anywhere between 1 minute or several or even 10s of minutes depending on the specific implementation and the desired accuracy. The long acquisition time is beneficial for at least the following two reasons. First, the lithium nuclei must become polarized before the lithium nuclei may be detected with NMR and the characteristic polarization time for lithium nuclei may be quite long, in excess of 10 seconds. Each scan must be repeated 2-4 times with its phase cycled in order to remove signal offsets. Thus, around 1 minute is or may be a minimum single point acquisition time for lithium. For other ions with shorter polarization times, such as sodium, this single acquisition minimum time may be much reduced. Second, the longer the acquisition time, the more signal averaging and thus better signal-to-noise ratio which is a relevant, important or critical measure of tool performance. Weak signal is always a challenge for NMR tools. The stopped flow measurement may be done in the flow line 26 or possibly in a bypass line (not shown in the drawings) sealed off from the flow line 26 if continuous pumping and flow were important to the service. In such case, the measurement may be very similar to the standard laboratory measurement where a sample is placed within the magnet and NMR acquired. Moreover, the NMR system, the sensor 12, and/or the tool 10 may be placed around the sample collection chamber or bottle and the measurement performed there in the same way as in the stopped flow line or on the bypass line. Of course, under a design choice, the NMR system would be fixed at a particular location rather than moving around the downhole tool 10 and doing the measurements at different spots. If multiple measurement points are of interest, multiple systems may be installed along the flow line 26 and sample collection bottles.

In one or more embodiments, at least one variant is or may be to combine the two operational modes. As a result, a less accurate trending measurement may be performed, acquired, and/or provided while the borehole fluid 23 is being or may pumped and/or flowing through the instrument, sensor 12, and/or downhole tool 10, and then periodically perform the more accurate stopped-flow measurement for a fully quantitative assessment. In at least one embodiment, the borehole fluid 23 may be, include, comprise, or consist of at least one drilling fluid. Further, the trending measurement may provide an indication of a steady-state in the pumped fluid property being reached which would be validated with the stopped-flow measurement. As a result, the at least one variant provides or may provide a good indication of the progress of the pumping and/or at least one suggestion for the timing of the stopped-flow measurement.

In some embodiments, the measurement may be triggered automatically once the borehole fluid 23 is or may be flowing or the measurement may be activated manually by an operator at the surface monitoring the job. Moreover, the results may be sent to at least one surface logging unit in real time or in a delayed mode or even stored on at least one tool memory chip for subsequent retrieval.

In one or more embodiments, drilling fluid or the borehole fluid 23 may have invaded the formation 20 near the borehole 18 if the borehole fluid 23 was used prior to the tool measurement. Further, the borehole fluid 23 initially sampled by the tool may not be representative of the native fluid of interest. Before a sample may be collected or final measurement conducted on the sampled fluid it is, therefore, relevant and/or important to ensure the native formation fluid is being sampled rather than the drilling fluid. This quality control may be an important aspect of any formation fluid collection exercise. Still further, a special module of the downhole tool 10 uses or may utilize at least one optical spectroscopy to detect the presence of the borehole fluid 23 in the flow stream. A similar approach may be taken here though it would be costly as requiring adding a whole other measurement system just for sample quality control.

In some embodiments, an alternative may be to use the NMR module itself to detect the contamination of the sampled fluid with the drilling fluid. Depending on the type of drilling fluid used, there may be specific NMR-active target molecules there that could serve as markers of the drilling fluid. A very simple indicator may be to use the hydrogen nucleus measurement and the relaxation time of the water as the marker. Formation water, once not in contact with the rock matrix, will typically have long relaxation times of 1 second or longer. The borehole fluid 23, on the other hand, may have much shorter relaxation times depending on the types of additives used. Thus, one may monitor the evolution of the hydrogen relaxation time (either T1 or T2) and/or call the sample pure (or containing mostly native fluid) once it plateaus and/or reaches a prescribed value. Similarly, one may monitor the lithium concentration in the flow stream until it reaches a steady state. Or one may monitor any other NMR marker in the drilling fluid until its levels get below a certain threshold. The multi-nuclear sensing system discussed above may enable this application.

Lithium NMR Downhole Interpretation and Acquisition Parameters

Figure 8:
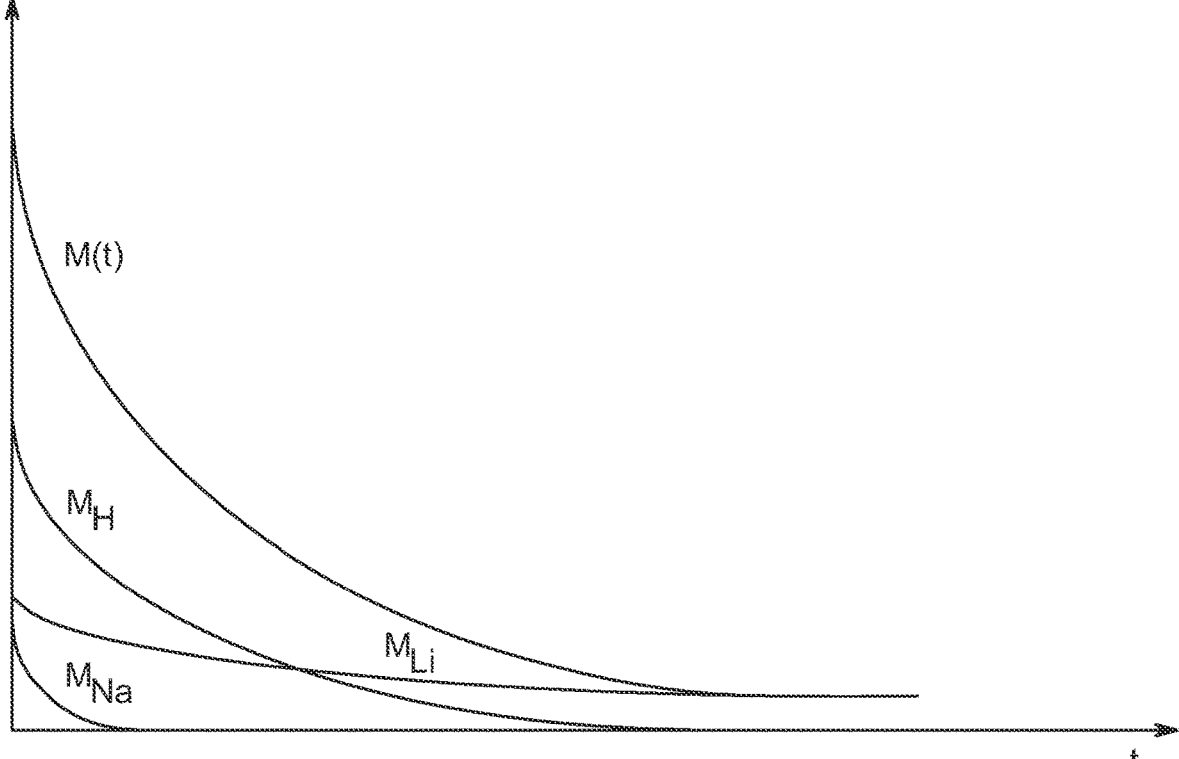
FIG. 8 is a graphical representation of different nuclei contributions to the total NMR signal M(t) as a function of time t, according to one or more embodiments of the present disclosure.

If a tool design of the downhole tool 10 may result in sample-filled regions of inhomogeneous field in some embodiments, it may be almost unavoidable to get signal contributions from other nuclei. The signal itself as it may be detected by the coil 30 may not carry a nucleus-depended marker; it may be just a magnetic field within a particular frequency band entering a coil, the same irrespective of its origin. However, the persistence of the field in time, or more precisely the signal decay or relaxation with time, may depend on the nucleus and/or may be determined by each nucleus's property called its relaxation time. Thus, the total signal as a function of time t, $M(t)=\Sigma_i M_i(t)$ where the $M_i(t)$ are signal contributions from different nuclei i, such as lithium, hydrogen, or sodium. FIG. 8 shows an NMR signal decay curve M(t) indicating contributions of signal from lithium, hydrogen, and sodium. Notice that lithium relaxes the slowest such that past a certain time the total signal will or may be dominated by lithium and the methods disclosed herein utilizes this property of the lithium nuclei to extract the lithium signal from the other nuclei.

In one or embodiments, the methods disclosed herein may extract the lithium signal and/or measure the lithium concentration by utilizes a 2 or 3 exponential fit, for example, $M(t)=M_H e^{-t/T_H}+M_{Li}e^{-t/T_{Li}}+M_{Na}e^{-t/T_{Na}}$, and fit all the free parameters from the decay data of the decay curve M(t). The lithium concentration may then be given by the fitted parameter $M_{Li}$. This approach may work well for clean samples but may fail in real downhole situations given the large uncertainties on the brine composition (i.e., borehole fluid 23). The relaxation times are a function of the nucleus itself but also of its chemical environment and how the nucleus couples to the nuclear spin. Thus, there is or may be a spread of relaxation time values associated with a particular nucleus, often described by a distribution. This distribution of relaxation times may be extracted from the measured time-domain signal M(t) via at least one inversion procedure.

Figure 9:
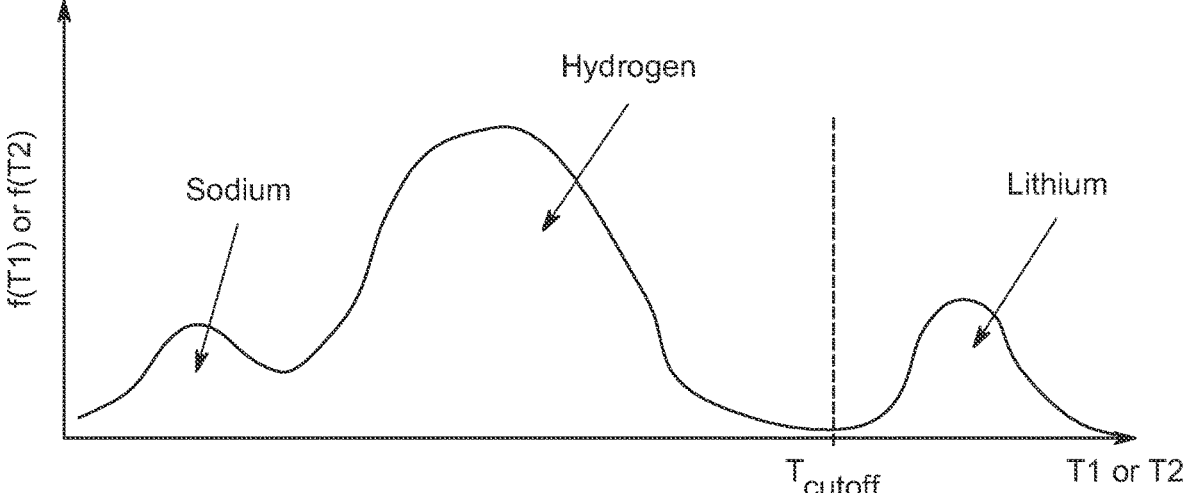
FIG. 9 is a graphical representation of a possible T1 or T2 distribution from at least one NMR signal with contributions from different nuclei, according to one or more embodiments of the present disclosure.

In some embodiments, there are or may be at least two modes of relaxation: spin-lattice governed by T1 relaxation time and spin-spin governed by T2 relaxation time. Depending on the particular rf pulse sequence used for signal acquisition, it is or may be possible to invert the signal M(t) for the distribution of T1 times f(T1), the distribution of T2 times f(T2), or for a joint T1-T2 distribution f(T1,T2). The discrimination between the signal deriving from different nuclei will come from the fact that lithium relaxation times tend to be longer than the relaxation times of hydrogen or sodium, typically being in excess of 10 seconds. The T1 and T2 of hydrogen on the other hand tend to be less than 5 seconds and often stretch all the way down to 10's of milliseconds (hereinafter "ms"). Sodium relaxes very fast, with relaxation times of the order of 10's of ms. A possible distribution of relaxation times from a downhole measurement is shown in FIG. 9. The overlap between the hydrogen and sodium signal peaks is not a concern, as the signal peaks are both signals that need to be eliminated.

Because a lithium peak is or may likely to occur at much longer relaxation times, a cut-off time $T_{cutoff}$ may be fixed to fix the relaxation time beyond which there would only be lithium signal. This cut-off time may depend on one or more reservoir properties and/or may vary depending on the type and composition of the rock matrix of the formation 20. It may need to be fixed by calibration for each reservoir as is or may be done in oil & gas petrophysical applications, perhaps by collecting a core sample and saturating and measuring it in the lab. However, based on the bulk values of lithium relaxation $T_{cutoff}$ may be in the range of a few seconds to a few dozen seconds depending on the specific reservoir, the temperature, and lithium interactions with other minerals in the brine or in the rock matrix. In an embodiment, the total amount of lithium signal may then be extracted by integrating the distribution from $T=T_{cutoff}$ till the top.

In one or more embodiments, the methods disclosed herein may include, comprise, or consist of choosing one or more acquisition parameters and/or at least tool design. Because the lithium relaxation times are so long, the logging parameters are or may be chosen based on the lithium relaxation times. Thus, polarization times are or may be long, in excess of 10 seconds, while the echo spacing in the CPMG sequence may also be long. This contrasts with the typical petrophysical applications where the objective in tool design and operation is to reach as short an echo spacing as possible. For lithium, this is not necessary, thus relaxing the stringent hardware requirements. This is or may be relevant and/or important because it severely reduces the power requirements of the whole tool as most of the power is consumed by rf pulses. This is or may be relevant and/or important for Thrubit-like and other battery-operated applications affecting the tool length, cost of service delivery, and/or interoperability with other tools. Furthermore, by reducing the overall duty cycle of the tool operation, it will or may reduce the specification requirements on various components of the high-power section, such as, for example, one or more capacitors and/or only or more high-voltage power supplies, because risk of overheating and/or aging is or may be significantly and/or substantially reduced.

In some embodiments, the T1's of lithium are or may be long and the logging speed(s) needs or may need to be lower to give the nuclei more time to become polarized. Moreover, one or more hardware designs of the downhole tools 10 may be optimized for fast-logging operations and/or the optimized one or more hardware designs may need to be applied to the downhole tools 10 to make the downhole measurement(s) feasible or at least substantially feasible.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A downhole tool for measuring at least one lithium concentration of a fluid in a borehole disposed within a surrounding formation, the downhole tool comprising:

an internal chamber;

at least one flow line configured to direct the fluid in the borehole into the internal chamber along a flow path;

a nuclear magnetic resonance (NMR) sensor disposed within the internal chamber, wherein the NMR sensor has a flow-through NMR tool geometry comprising a magnet-coil assembly, wherein the magnet-coil assembly comprises:

one or more magnets that surround the at least one flow line; and at least one tunable radiofrequency (RF) coil tuned to match a first Larmor frequency of a nucleus of lithium;

first electronics connected to and in communication with the NMR sensor; and second electronics and an NMR spectrometer connected to and in communication with the first electronics such that the NMR sensor is connected to and in communication with the second electronics and the NMR spectrometer via the first electronics, wherein the downhole tool is one selected from the group consisting of a NMR-based lithium open-hole logging tool, a permanently mounted downhole NMR-based lithium monitoring tool, and a downhole NMR-based lithium fluid sampling tool.

2. The downhole tool of claim 1, wherein the downhole tool is the NMR-based lithium open-hole logging tool and NMR sensor has a centralized inside-out NMR tool geometry or a single-sided inside-out NMR tool geometry.

3. The downhole tool of claim 1, wherein the downhole tool is the NMR-based lithium open-hole logging tool.

4. The downhole tool of claim 2, wherein the NMR sensor has the centralized inside-out NMR tool geometry with the one or more magnets comprising a first magnet and a second magnet and the at least one tunable RF coil disposed between the first magnet and the second magnet or the NMR sensor has the single-sided inside-out NMR tool geometry with the at least one tunable RF coil disposed between the one or more magnets and a wall of the downhole tool.

5. The downhole tool of claim 1, wherein the NMR sensor has a length defined between a top end and an opposite bottom end, the magnet-coil assembly is disposed between the top end and the opposite bottom end, and a portion of the at least one flow line extends from the top end through the magnet-coil assembly to the opposite bottom end.

6. The downhole tool of claim 1, wherein the downhole tool is the permanently mounted downhole NMR-based lithium monitoring tool that is stand alone or mountable on at least one completion or downhole hardware element.

7. The downhole tool of claim 1, wherein the downhole tool is the downhole NMR-based lithium fluid sampling tool comprising pistons and/or calipers for pushing the downhole tool against the surrounding formation.

8. A system for measuring and/or monitoring at least one lithium concentration of the fluid in a subterranean formation or a wellbore disposed within the subterranean formation, the system comprising:

the downhole tool of claim 1 disposed within the wellbore; and at least one sensitive region defined by the magnet-coil assembly of the NMR sensor and fully contained within the subterranean formation or the wellbore, wherein the NMR sensor is configured to acquire at least one NMR-based lithium concentration measurement of the fluid at the at least one sensitive region within the subterranean formation or the wellbore.

9. The downhole tool of claim 8, wherein the fluid is a lithium brine and the wellbore is a lithium brine producing well.

10. The downhole tool of claim 8, wherein the sensitive region is disposed within the subterranean formation or between the at least one tunable coil and a wall of the wellbore.

11. The downhole tool of claim 9, wherein the downhole tool is the NMR-based lithium open-hole logging tool and NMR sensor has a centralized inside-out NMR tool geometry or a single-sided inside-out NMR tool geometry.

12. The downhole tool of claim 1, wherein the downhole tool is an open-hole production logging tool.

13. The system of claim 1, further comprising:

at least one downhole element or hardware element disposed within a wellbore, wherein the downhole tool is attached to or is part of the at least one downhole element or hardware element.

14. The system of claim 8, further comprising at least one of:

a wireline or slickline deployed within the wellbore and comprising the downhole tool;

a drill string deployed within the wellbore and comprising the downhole tool and at least one drilling tool; or a coiled-tubing deployed within the wellbore and comprising the downhole tool.

15. A method comprising:

deploying the downhole tool of claim 1 into a wellbore disposed within a subterrain formation;

acquiring at least one lithium NMR-based measurement of the fluid at a sensitive region within the subterrain formation or the wellbore, wherein the sensitive region is defined by the magnet-coil assembly of the NMR sensor; and determining a lithium concentration of the fluid at the sensitive region based on the acquired at least one lithium NMR-based measurement.

16. The method of claim 15, further comprising;

interpretating an acquired signal based on relaxation distributions of total acquired signals, wherein the acquired signal is indicative of the acquired at least one lithium NMR-based measurement.

17. The method of claim 16, further comprising:

separating a lithium signal from confounding signals deriving from other non-lithium nuclei based on the interpretated acquired signal.

18. The method of claim 15, further comprising:

tuning the at least one tunable RF coil to match a second Larmor frequency of a nucleus of an element of interest, wherein the element of interest is at least one element selected from the group consisting of lithium, chlorine, cobalt, vanadium, uranium, iridium, manganese, boron, potassium, sodium, bromine, magnesium, terbium, europium, lanthanum, praseodymium, scandium, holmium, and lutetium.

19. The method of claim 18, further comprising:

acquiring at least one element of interest NMR-based measurement of the fluid at the sensitive region; and determining an element of interest concentration of the fluid at the sensitive region based on the acquired at least one element of interest NMR-based measurement.

20. The downhole tool of claim 1, wherein the one or more magnets extend away from the at least one tunable RF coil in an upstream direction with respect to the flow path.

21. The downhole tool of claim 1, comprising an electrical submersible pump disposed upstream of the NMR sensor with respect to the flow path.

22. The downhole tool of claim 21, wherein the electrical submersible pump is configured to homogenize the fluid along the at least one flow line before the fluid flows along the at least one tunable RF coil.

*   *   *   *   *